April 15, 1958 C. B. STANSFIELD 2,830,425
COTTON STRIPPER UNIT WITH MOVING COMB ELEMENTS
Filed April 14, 1954 7 Sheets-Sheet 1

INVENTOR
CHARLES B. STANSFIELD
BY
ATTORNEY

April 15, 1958　　　C. B. STANSFIELD　　　2,830,425
COTTON STRIPPER UNIT WITH MOVING COMB ELEMENTS Filed April 14, 1954　　　　　　　　　7 Sheets-Sheet 3

INVENTOR
CHARLES B. STANSFIELD
BY
ATTORNEY

April 15, 1958  C. B. STANSFIELD  2,830,425
COTTON STRIPPER UNIT WITH MOVING COMB ELEMENTS
Filed April 14, 1954  7 Sheets-Sheet 6

INVENTOR
CHARLES B. STANSFIELD
BY
ATTORNEY

United States Patent Office 2,830,425
Patented Apr. 15, 1958

2,830,425

COTTON STRIPPER UNIT WITH MOVING COMB ELEMENTS

Charles B. Stansfield, Woodville, N. C., assignor to Harrington Manufacturing Company Incorporated, Lewiston, N. C., a corporation of North Carolina Application April 14, 1954, Serial No. 423,062

11 Claims. (Cl. 56—35)

This invention relates to harvesters and in particular to a harvester for stripping cotton plants.

Stripper type cotton harvesters have been developed to provide an economical method of harvesting cotton. A shortage of farm labor and the cost thereof has necessitated the development of these mechanical picking devices. One disadvantage with mechanical cotton harvesters, particularly those of the stripper type, is that when the cotton is stripped from the plants a substantial amount of twigs, grass, leaves and other trash is picked up and mixed with the cotton. This, of course, lowers the purity of the cotton. The quality is lowered to such an extent as to result in a lower sales value than with hand picked cotton. Also thorough cleaning and ginning is more difficult to obtain, and even cotton mills have greater difficulty in obtaining clean lint. An object of this invention is to provide a cotton stripper which will efficiently and effectively strip cotton from the plants and which will not pick up large amounts of trash. The objects of this invention also include the provision of a mechanical cotton stripper which will not materially reduce the quality of the cotton, and one which will not twist the cotton fibers around trash and twigs.

The mechanical cotton pickers which are known in the prior art are cumbersome machines. They comprise wheeled frames adapted to be towed by a tractor or similar vehicle. As a result they are difficult to handle and are not as maneuverable as could be desired.

Yet another object of this invention is to provide a cotton stripper which can be mounted on a tractor and which does not comprise a separate vehicle which must be towed.

The average farmer has a tractor and such a vehicle provides a prime mover and carrier for a cotton picker constructed in accordance with the invention. A cotton picker constructed in accordance with my invention can be readily attached to a tractor and driven thereby. Furthermore, as a result of the construction shown hereinafter, the cotton stripper is highly maneuverable and extremely easy to handle.

Yet another disadvantage of prior known devices, which necessarily follows from their complexity and size, is that they are extremely costly. Their high cost places them out of the reach of many farmers. It is, therefore, still another object of this invention to provide a picker which can be relatively cheaply produced and sold.

Still another object of this invention is to provide means for picking two rows of cotton at once. According to the invention two stripper units constructed in accordance with the invention can be attached to a single tractor so as to provide a highly maneuverable, efficient low cost double row stripper. An important object of my invention is to provide a cotton picker which is extremely compact as compared to prior known pickers, thus providing a picker which can be attached to a tractor, which is light in weight, easy and cheap to manufacture and which can be conveniently handled.

Additional objects of my invention are to provide a harvester which will harvest cotton and other plants, which can be adjusted to be effective close to the ground, but with which there will be ample clearance for operating the harvester. With cotton plants particularly it is important that the mechanical picking means extend close to the ground, due to the nature of the cotton plant. However, it is also important that the picker does not dig into the ground to any great extent. The invention further is so constructed that it does not pick up grass, for example, yet is still close to the ground.

Further objects include the provision of a mechanical picker for cotton which duplicates hand stripping, which does not mat or crush foreign material into the cotton, and with which cotton is removed from the picking means by gravity and no reliance is had on suction or blowing. In addition, the invention includes the provision of spring steel picking fingers which can be easily replaced if damaged.

These and other objects and advantages will become apparent from the following description and the accompanying drawings, in which.

Many of the views have portions broken away for clarity, and in some duplicate parts are indicated by phantom lines.

Referring now in particular to the drawings, reference character 10 indicates a longitudinal frame member which extends along one side of the harvester and 12 indicates its opposite counterpart. Vertical frame members 14, 16, 18 and 20 extend upwardly adjacent the forward end of the harvester. Lateral members 22 and 24 connect the upper ends of members 14 and 16 and 18 and 20, respectively. Braces, such as 26, are provided as necessary. Members 14, 16 and 22 are used to support the front end of the harvester on a tractor, as hereinafter described.

Longitudinal frame members 10 and 12 are provided with aligned pairs of journal blocks 28, 30 and 32. The forward journal blocks rotatably support stub shafts 34, each of which has a sprocket wheel 36 mounted thereon.

Bearings 30 rotatably support shaft 38 on which are mounted sprockets 40 and 42. Clutch 44 is mounted on shaft 38 and is drivingly connected to clutch 46 on shaft 48 by chain 50. Shaft 48 is in turn connected to axle 52 by chain 54 and sprocket gears 56 and 58.

Figure 1:
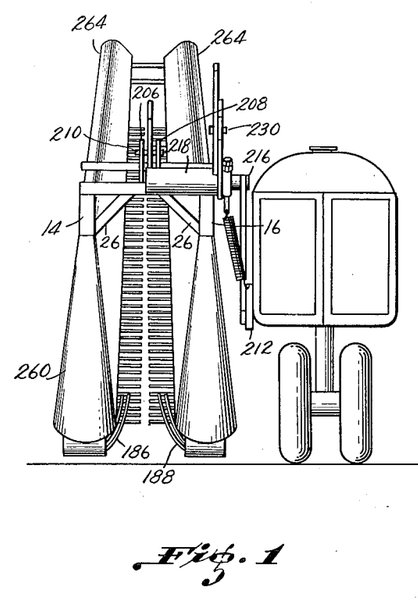
Figure 1 is a front view of a tractor and picker constructed in accordance with the invention.
Figure 2:
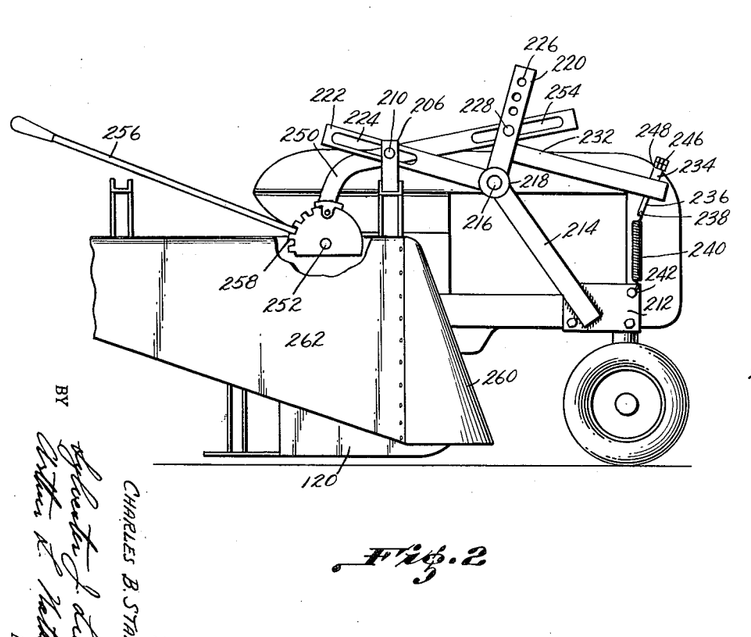
Figure 2 is a fragmentary side elevational view thereof.

Axle 52 is the drive axle of the tractor illustrated in Figs. 1 and 2; which can be any tractor similarly constructed. The sprocket gear 58 is placed on the axle in any suitable manner, for example: the tractor wheel, etc., can be removed, and the sprocket gear placed on the axle. The gear can remain on the tractor axle at all times even when the harvester is not attached to the tractor, as will be explained hereinafter.

Shaft 48 is continuously driven whenever the tractor is moving and clutch 46 is a means for connecting and disconnecting the drive to the harvester. Clutch 46 comprises an element 60 fixed to shaft 48 and slidable sprocket 62 is movable on the shaft. A clutch fork is connected to pin 64, as is well known. Clutch 44 is an overload clutch and comprises toothed member 66 which is fixed to shaft 38 and toothed member 68 which is slidably mounted thereon. Spring 70 bears against collar 72 at one end and sprocket 74 at its other end. Since sprocket 74 is fastened to member 68 this normally keeps the clutch engaged. The teeth on members 66 and 68 are formed, in a well known manner, so that should the picker jam, toothed member 66 will disengage from toothed member 68, depressing spring 70.

Figure 8:
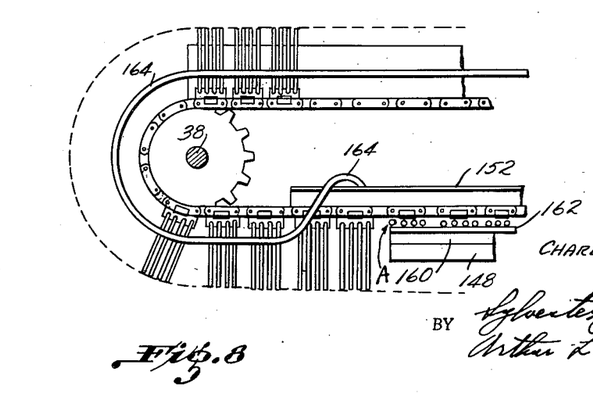
Figure 8 is an enlarged sectional view taken along line 8—8 of Fig. 5.
Figure 9:
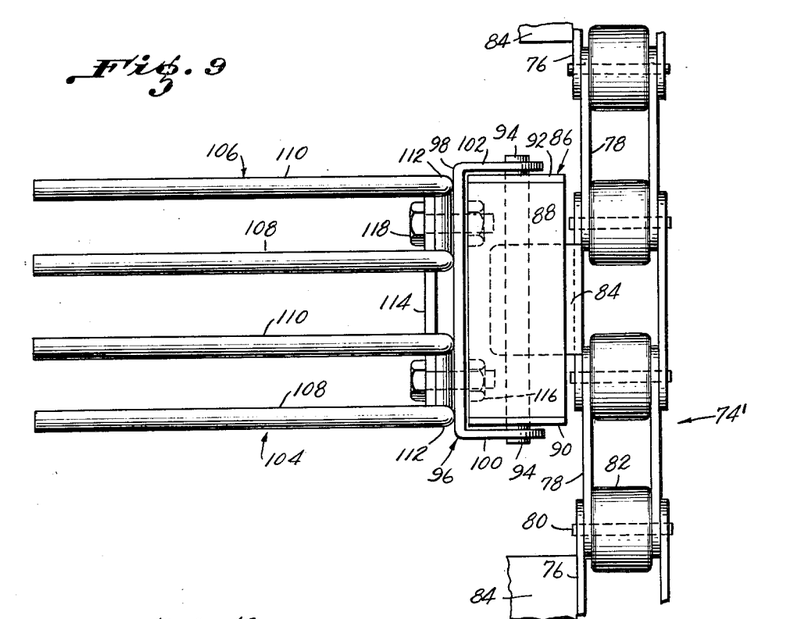
Figure 9 is an enlarged plan view showing a portion of the apparatus.

Sprocket chains 72' and 74' are mounted on sprockets 36 and 40 and 36 and 42, respectively. Since both chains and their cooperating elements are identical only one chain and its associated structure will be described in detail. Chain 74' is substantially a common linked sprocket chain, as shown in Figs. 8 and 9, and comprises outer and inner links 76 and 78 connected by pins 80 to rollers 82. The inwardly facing outer links 76, however, each have laterally extending brackets 84 connected thereto. Obviously these brackets could be one leg of an angle member secured to the links by welding or any other suitable means.

Figure 10:
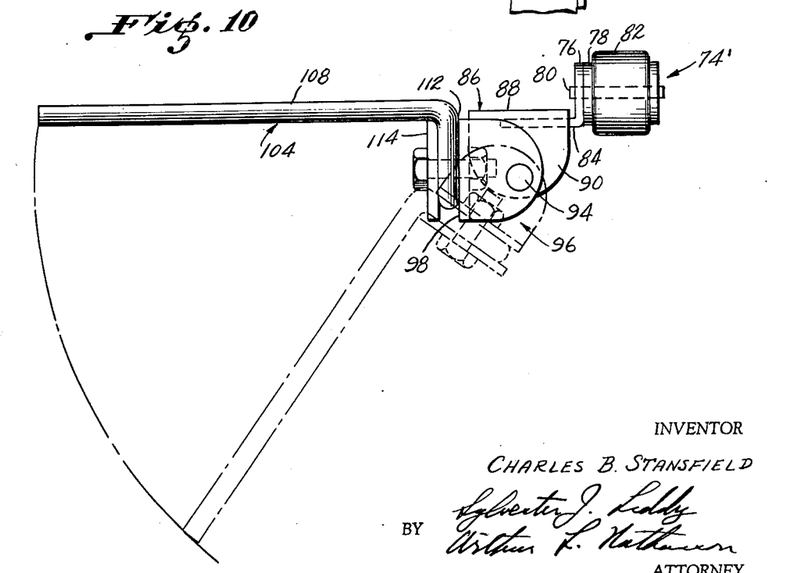
Figure 10 is an enlarged elevational view of the mechanism shown in Fig. 9.

Journal block 86 has its base 88 fixedly connected to bracket 84. A pair of opposing flanges 90 and 92 extend outwardly from base 88, and pin 94 is rotatably supported therein parallel to link 76. A second member 96 formed similar to member 86 and comprising base 98 and flanges 100, 102, is pivotally connected to pin 94. Pin 94 can be headed or have cotter pins to limit endwise movement. Spring finger members 104 and 106 are secured to base 98. Each of the spring finger members comprises a single piece of spring steel bent to form two parallel fingers 108 and 110 and a mounting flange 112. Flange 112 seats on base 98. Plate 114 and nuts and bolts 116 and 118 securely fasten the two finger members in position. Members 86 and 96 are constructed to permit free rotational movement of fingers 104 and 106 downwardly as viewed in Fig. 9. Flanges 100 and 102 can freely rotate on pin 94. The fingers cannot move above the horizontal position shown in Fig. 9 since elements 98 and 88 prevent such movement. Figs. 9 and 10 illustrate the chain and attached elements as they appear in the lower, rearward and upwardly moving picking run described hereinafter.

As stated above, the two sprocket chains 72' and 74' are reeved over sprockets 36 and 40 and 36 and 42. Whenever clutch 46 is in engaged position the sprocket chains are driven in a manner such that the upper runs of the chains move in an inclined path downwadly toward the front of the harvester while the lower runs move upwardly and rearwardly. The size of the sprocket gears is preferably selected so that the rearward movement of the lower run of the chains is at the same rate as the forward movement of the harvester. As a result the picker fingers in the lower run of the chain have no horizontal motion with respect to the ground. Their movement with respect to the ground and the plants is entirely vertical. As a result of such movement the picker fingers have a lifting action with respect to the plants. The fingers move upwardly through the branches without any tendency to snap the branches off. The lifting action duplicates hand stripping of the plants.

The harvester further includes skids 120 having rub plates 122 fixed to the lower surface thereof. The skids 120 are supported on the members 10 and 12, by vertical supports 124 and 126.

A series of spaced hangers, such as 128, 130, 132 and 136 are fastened to the lower flanges of frame members 10 and 12 by welding or any suitable means. Each of these hangers comprises an upper flange 138, a depending leg 140 and an inwardly extending lower flange 142. Channel members 146 and 148 are supported from frame members 10 and 12, respectively, by the hangers 128, etc., with the channels facing upwardly. The hangers are of equal length, and the channel members 146 and 148 extend parallel to frame members 10 and 12. Angle iron members 150 and 152 are also connected to and supported parallel to elements 10 and 12 by hangers 128, etc. The upper legs of the angle members project inwardly over the channel members 146 and 148. Plates 154 and 156 connect the outer flanges of members 146 and 150 and 148 and 152, respectively, to form a housing on each side of the harvester.

Figure 7:
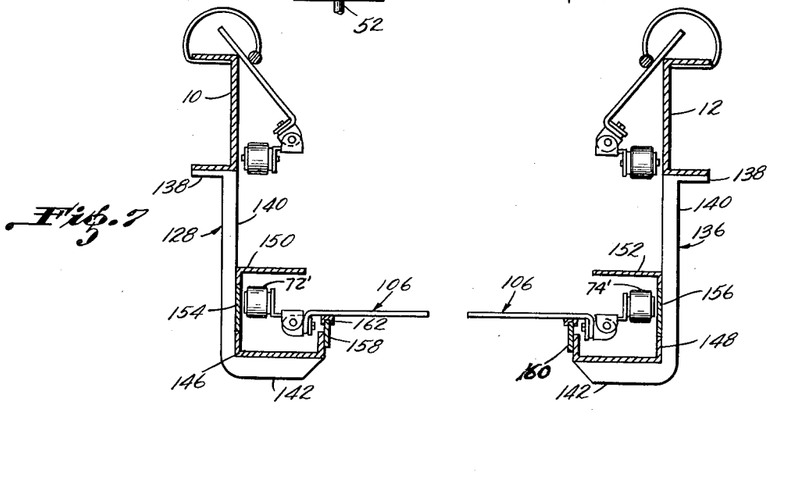
Figure 7 is an enlarged sectional view taken along line 7—7 of Fig. 5.

Plates 158 and 160 are connected to the inner flanges of channel members 146 and 148 and project thereabove. These plates, as shown in Fig. 7, support the spring fingers during the upward and rearward run of the chains. Plastic caps 162 formed of a suitable material frictionally engage and cover plates 158 and 160. The spring fingers rub on these caps. The housing and support means for the spring fingers extend rearwardly and upwardly to point A. At this point there is no longer any support for the spring fingers and, under the influence of gravity, they turn down as indicated in Fig. 10, in phantom lines, and in Fig. 8. The fingers simply drop off the caps 162 and hang vertically downward.

Figures 11, 12:
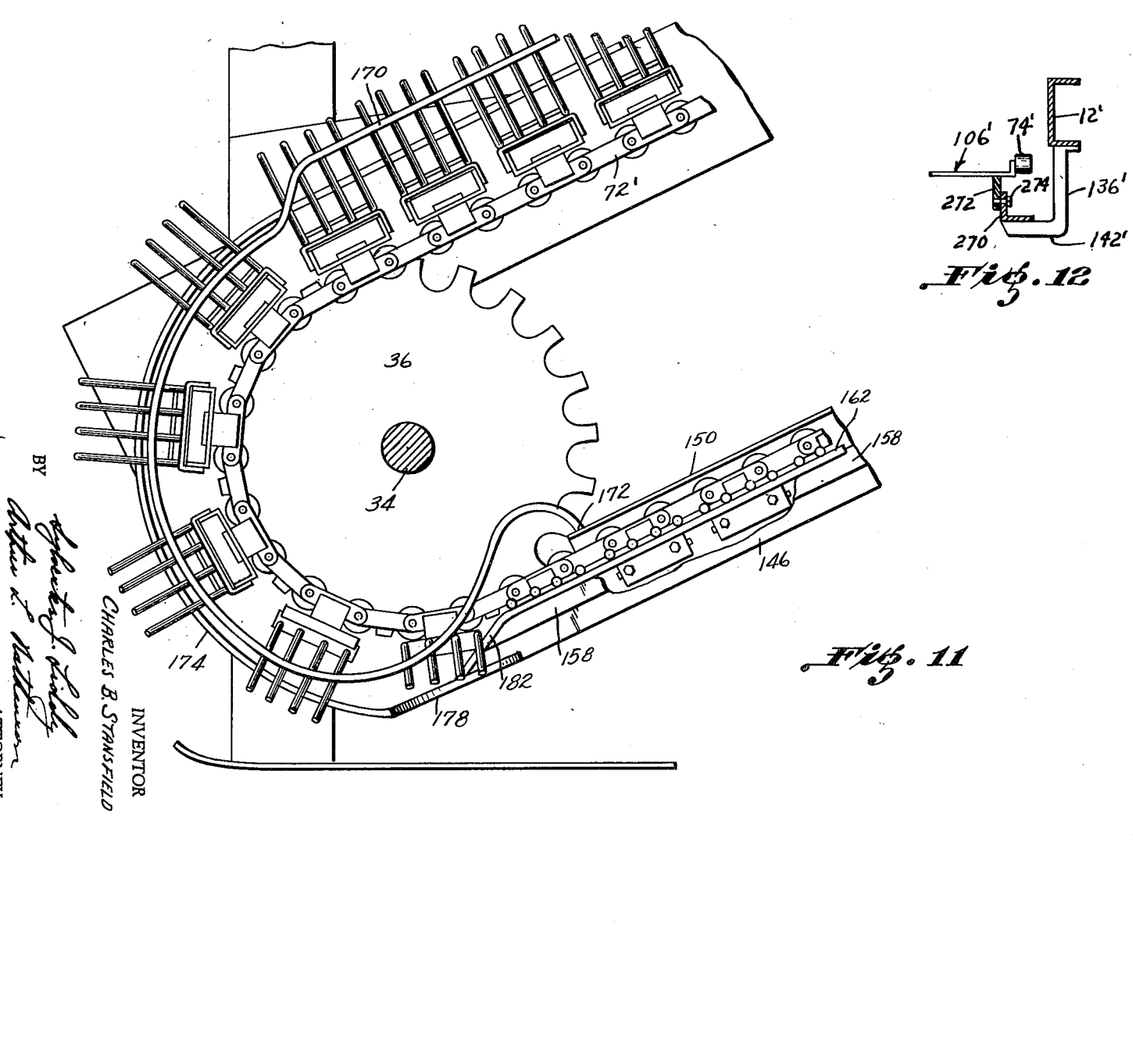
Figure 11 is an enlarged sectional view taken along line 11—11 of Fig. 5.
Figure 12 is an enlarged partial sectional view similar to Fig. 7 illustrating another form of support means for spring finger picking elements forming a part of the invention.

Figure 8 shows a guide rod 164 fixed to angle member 152 by welding or other suitable means. The guide rod curves downwardly from member 152, then extends along the path of movement of the finger members around the sprocket 42, and substantially parallel to the path of movement of the spring fingers and chains in the upper, downwardly and forwardly moving run along the upper part of the harvester. Straps 166 are positioned at spaced intervals to support the guide rod from frame member 12. At the forward end of the machine guide rod 164 curves downwardly, again following the path of the spring fingers as they rotate around the forward sprocket 36. Thereafter rod 164 extends rearwardly a short distance and then upwardly and is again attached to angle member 152 at 168. Guide rod 170 guides the stripper fingers at the left side of the machine, as viewed in Fig. 3, and is affixed to the frame members in the same manner as rod 164. Figure 11 shows guide rod 170 curving upwardly and attached to angle member 150 at 172. It is seen from Figs. 3, 4, 6 and 7 that the stripper fingers rest against the top of the frame members 10 and 12 on their forward and downward return run. The finger members extend substantially vertically upward from the chains. However, they lean slightly outwardly of the machine and overlie the chains.

At the forward end of the members 10 and 12 guide cams 174, 176, 178, and 180 are fastened to frame members 10, 12, 150, 146 and 152 and 148 respectively. Cams 174 and 176 curve inwardly toward the longitudinal center line of the machine as they progress downwardly and around the forward sprockets 36. They merge into cams 178 and 180 at points B and C. These latter cams have surfaces which continue inward toward the longitudinal center of the harvester.

Figure 3:
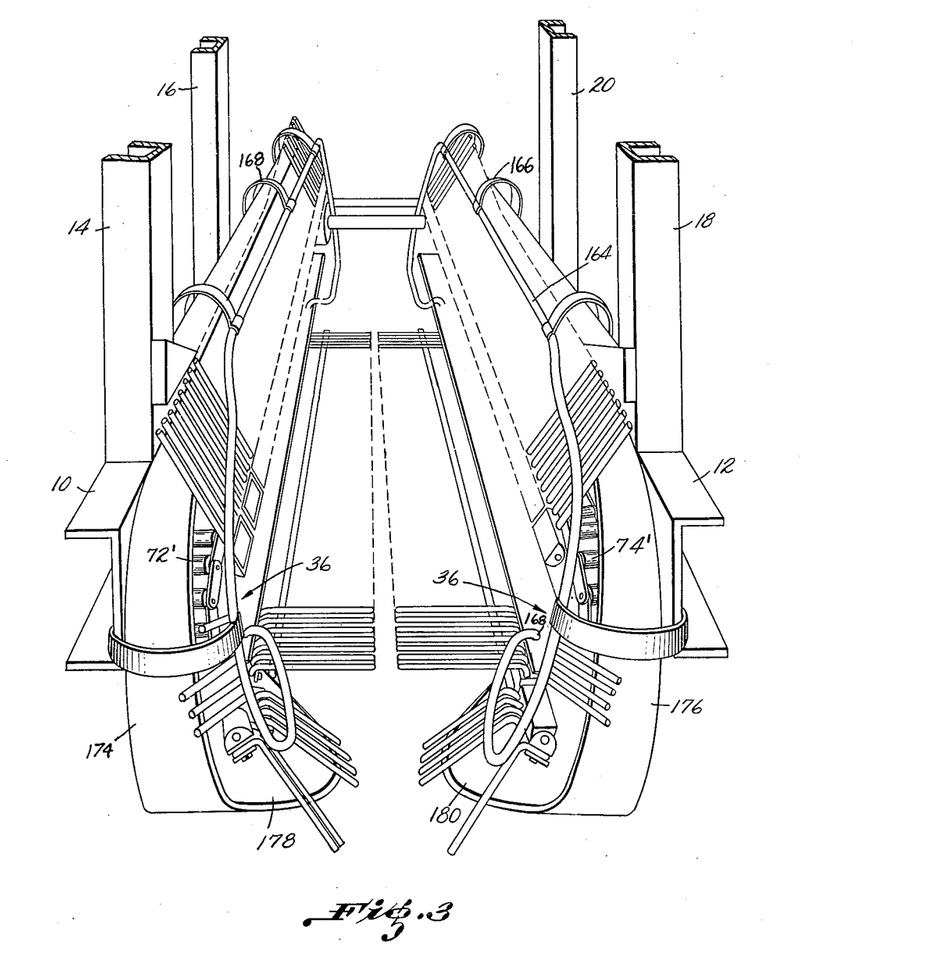
Figure 3 is an enlarged perspective front view with parts broken away and shown in section of the picker with the covers shown in Figs. 1 and 2 removed and showing the internal construction. The view is on a slight angle to improve showing.
Figure 4:
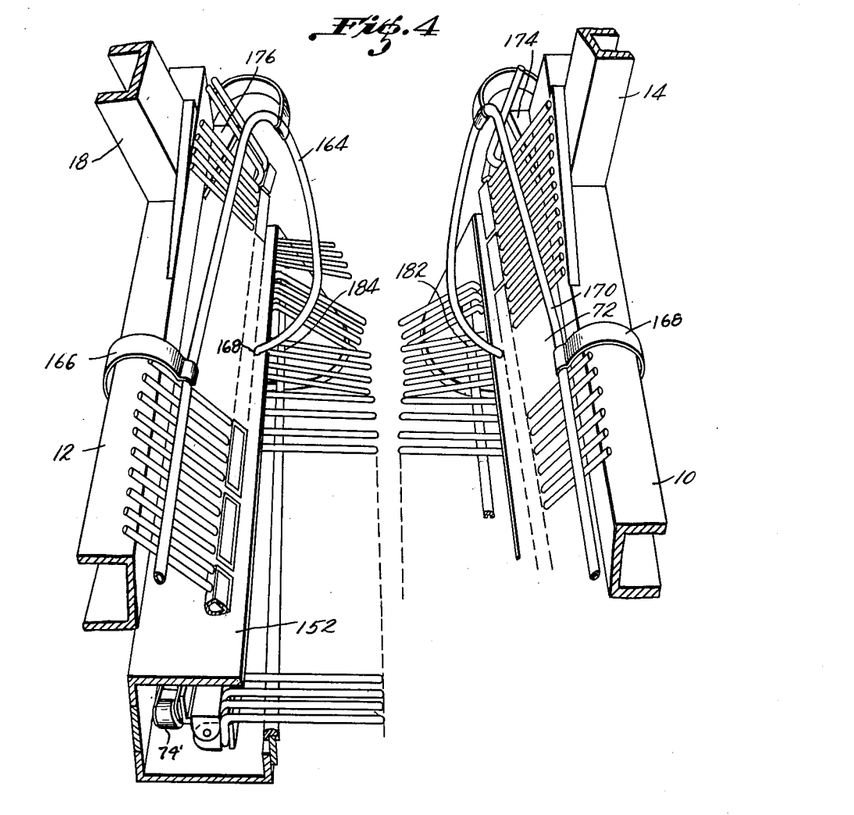
Figure 4 is a fragmentary perspective top view of the elements shown in Figure 3.
Figure 5:
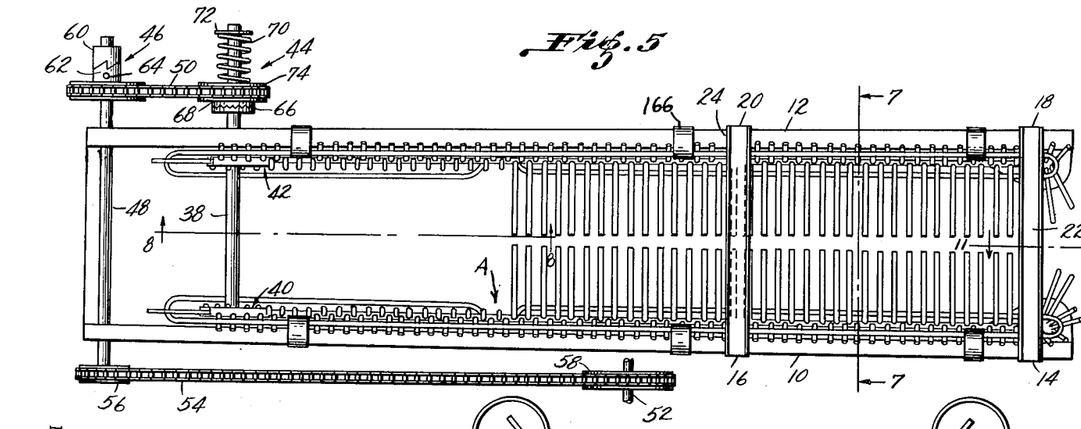
Figure 5 is a top plan view with the covers removed.
Figure 6:
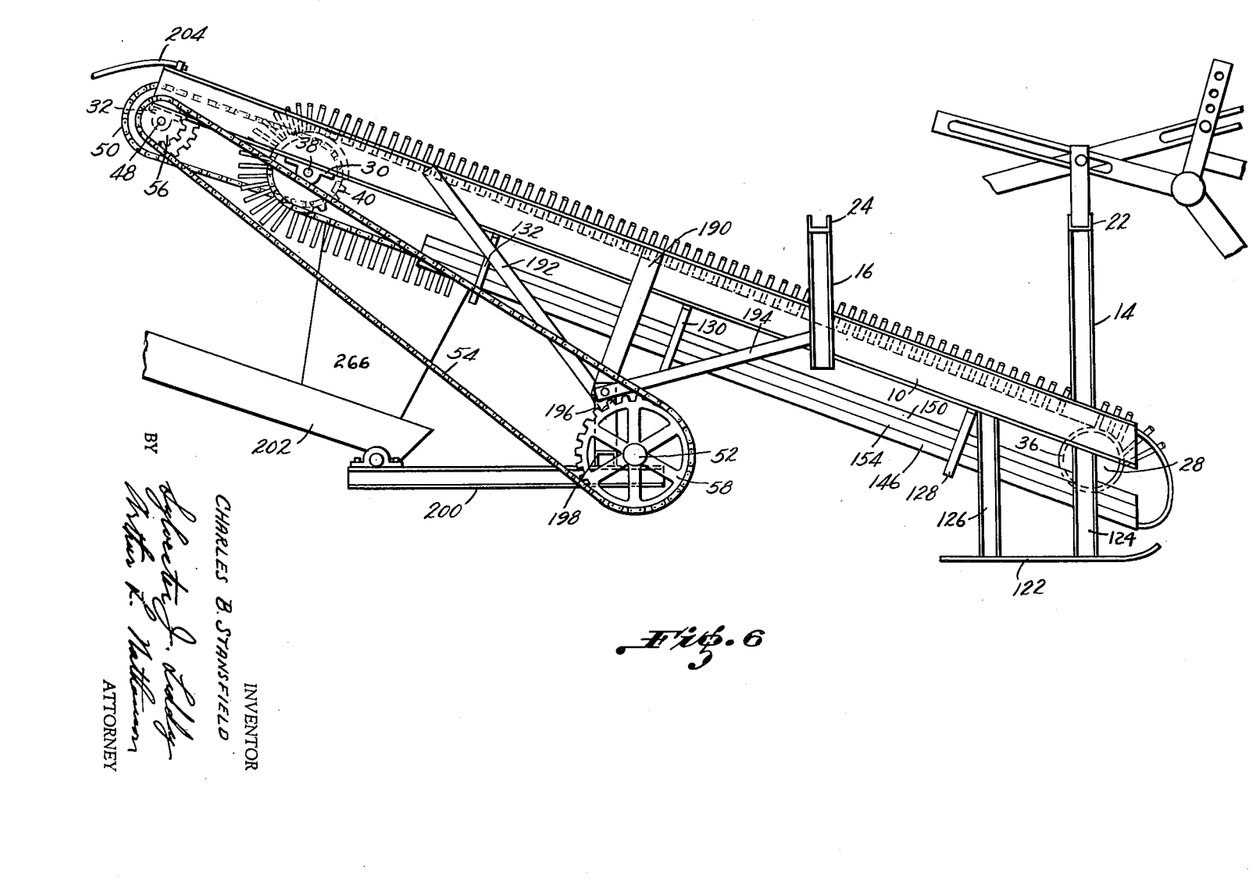
Figure 6 is a side elevational view with the covers removed.

As seen in Figs. 3 and 11, members 158 and 160 curve downwardly or are cut so as to present a downwardly curved surface at their forward ends, and merge into the upper surface of cams 178 and 180. The plastic caps 162 curve downwardly with their supporting members. The result is that the forward ends of members 158, 160 and their caps 162 form additional cams 182 and 184. These latter curve vertically upward. It is seen from examining the drawings that as the chains run around the forward sprockets the spring fingers engage the cams and are forced from the substantially vertical position of the upper runs to the horizontal position of the lower runs of the chains.

The fingers are gradually pivoted by cams 174 and 176 and pivoted with a faster, more whip-like, action by cams 178, 180, 182 and 184. As seen in Fig. 1 lifter fingers 186 and 188 can be fixedly attached to the skids to guide the lower branches of the cotton plants into position to be engaged by the picker fingers as they are abruptly swept upward by the cam surfaces when they start their rearwardly moving lower run. The picker fingers move vertically upward through the lower branches of the plants which are immediately adjacent the ground in a manner similar to that in which the fingers of a human picker would strip the cotton from the branches.

When the fingers reach the horizontal position there is a continued upward movement of the fingers through the plants due to the synchronism of the speed of movement of the chains with the forward movement of the harvester.

Side members 10 and 12 have vertical legs 190 extending downwardly therefrom. Braces 192, 194, strengthen and stiffen leg 190. Leg 190 is pivotally connected to vertical member 196. The latter rests on a housing 198 pivotally supported on the axle. A horizontal frame member 200 extends rearwardly from housing 198 and supports an enclosed belt conveyor 202. Rods 204 support the rear end of the belt conveyor. The harvester is pivotally supported on the rear axle of the tractor through means of members 190 and 196.

Referring now to Figures 1 and 2 it is seen that frame member 22 has a pair of spaced parallel plates 206 and 208 extending upwardly therefrom. Pin 210 is fastened in plates 206 and 208. The tractor has a plate 212 affixed to its frame adjacent the forward end thereof. A support bar 214 extends diagonally upwardly and rearwardly from plate 212 and can be attached to the latter by welding. Horizontal shaft 216 is fastened to the upper end of support member 214. Sleeve 218 is rotatably mounted on shaft 216. Sleeve 218 has two angularly positioned arms 220 and 222 which form a bell crank.

Arm 222 has a longitudinal slot 224 which receives pin 210. Arm 220 has a series of spaced holes 226 to receive headed pin 228. The spaced holes provide means for adjusting the pins 228 with respect to shaft 216. Pin 228 has a removable head 230 for affixing the pin in adjusted position.

A third arm 232 extends substantially laterally from arm 220 toward the front of the tractor and at its forward end has a boss 234. Stud 236 is received in boss 234. At its lower end stud 236 is pierced at 238 for reception of one end of a coil spring 240. The lower end of the spring is fixed to plate 212 by bolt 242. Stud 236 is provided with adjustable lock nuts 246 and 248 for adjusting the tension of spring 240.

Operating rod 250 is fixedly connected to shaft 252. At its forward end operating rod 250 has a slot 254 which receives pin 228. It is seen that by rotating shaft 252 operating rod 250 is rotated in an arc. The lowering of arm 250 forces arm 220 to rotate toward the left, as viewed in Fig. 2, lowering the harvester. When arm 250 is raised, arm 220 is forced to rotate to the right, raising the harvester.

Lever 256 is connected to shaft 252. The latter lever extends toward the operator of the tractor so that he may grasp it and raise or lower the harvester. The ratchet and pawl arrangement 258 is provided for fixing the harvester in an adjusted position. As seen in Figs. 1 and 2, a number of covers 260, 262 and 264 are provided for covering the operating mechanism as much as possible.

A chute 266 is connected to the side covers 264 adjacent the rear thereof to receive the cotton from the picking fingers as they drop to a vertical position off of members 158 and 160, and guide the same down onto the conveyor.

In Fig. 12 I have shown a view taken along a line the same as the right hand portion of Fig. 7 is taken. Fig. 12 illustrates another means of supporting the spring finger picker elements during their rearward picking run. The frame member 12' supports hanger 136'. Angle iron 270 is mounted on and supported by flange 142'. The spring finger elements 106' are connected to chain 74'. The chain and spring finger elements are indicated diagrammatically; details being unnecessary. Instead of mounting a separate plate on member 270 and then placing a plastic cap on top of the plate I show, in this form of the invention, a single plastic strip or plate 272 connected to member 270 by bolt and nut means 272.

The harvester can be removed from the tractor by disconnecting pin 210, removing leg 190 from member 196 and removing chain 54. The harvester can be removed or replaced on the tractor with ease. The conveyor 202 can be removed and replaced separately, or the whole unit, including frame member 200 and housing 198, can be detachably connected to the axle housing by strips or pins. The sprocket gear 58 can remain on the axle 52 with the harvester removed.

While I have shown and described a preferred form of my invention, it will be understood that variations in details of form may be made without departure from the invention as defined in the appended claims.

I claim:

1. A harvester comprising a frame, opposed pairs of sprocket gears mounted on said frame at spaced points, opposed sprocket chains each being meshed with a pair of said gears, said gears being supported on said frame with said chains being mounted so that each of said chains has an upper and a lower run with the upper run being disposed substantially vertical above the lower run and with the upper and lower runs of each chain facing the corresponding runs of the other chain, said sprocket gears being rotatable to move said chains each forwardly with respect to said harvester during said upper runs and rearwardly during said lower runs, picker elements connected to each of said chains, said picker elements comprising members pivotally connected to their respective chains so as to be pivotal on an axis parallel to the upper runs of said chains, said picker elements being movable with said chains during said upper and lower runs, means connected to said frame engageable with the picker elements on each of said chains during the upper runs thereof for supporting said picker elements in a substantially vertical position during said upper runs, means connected to said frame adjacent the lower runs thereof for supporting said picker elements in a substantially horizontal position during the lower runs thereof, and means connected to said frame cooperating with said picker elements intermediate the upper and lower runs of said chains for moving said elements from a substantially vertically disposed position with respect to said lower runs to a horizontal position during said lower runs as said picker elements move from said upper to said lower runs.

2. The apparatus of claim 1 wherein said picker members comprise rod-like members and the rod-like members connected to each chain extend horizontally outwardly toward the rod-like members of the other chain during said lower rearward runs and said rod-like members on one chain are horizontally spaced from the rod-like members of the other chain during said lower runs.

3. The apparatus of claim 1 wherein the means for moving said picker elements from the substantially vertically disposed position with respect to said lower runs to the horizontal position comprises cam means and said cam means is adapted to move said elements upwardly toward a horizontal position with a speed greater than the speed of movement of said elements along said lower runs to produce a whip-like action during a portion of their movement from said vertically disposed position to said horizontal position.

4. The apparatus of claim 1 wherein the last named means includes cam means, said cam means being adapted to move said element vertically upward with respect to the horizontal position said elements assume in said rearward run at a speed in excess of the speed of movement of said elements during said runs parallel to said runs.

5. The apparatus of claim 1 wherein the last named means includes a series of cams associated with each of said chains to move said elements vertically upward during the movement of said elements with said chains at a speed greater than the movement of said elements parallel said chains.

6. The apparatus of claim 1 wherein said frame includes a side member with said elements being adapted to rest against said side member during the forward runs, and a guide rod spaced from said side member, said fingers being confined to move between said side member and said guide rod during said forward run.

7. The apparatus of claim 1 wherein said chains comprise links, brackets connected to alternate of said links along one side of each of said chains, each of said brackets having a horizontally extending flange, a journal block connected to each said flange, said elements being pivotally connected to the journal blocks.

8. The apparatus of claim 1 wherein each of said chains includes spaced flanges connected thereto, journal blocks mounted on each of said flanges, the elements of each of said chains being connected in groups to said journal blocks by means piovtal about an axis parallel to the links of the chain to which they are connected.

9. The apparatus of claim 1 wherein said elements are pivotal about an axis parallel to the links of said chains and are pivotal substantially in a downward direction only during the horizontal rearward run of said chains.

10. The apparatus of claim 1 including means for pivotally connecting said elements to said chains comprising journal block means, each of said elements being connected to one of said journal block means.

11. The apparatus of claim 1 wherein the means for supporting said elements during said lower runs support said elements for a portion of said lower runs only, said elements being pivotal downwardly into a vertical position during said lower runs when they are no longer supported by said support means.

References Cited in the file of this patent

UNITED STATES PATENTS

| | | |
|---|---|---|
| 327,649 | Boswell | Oct. 6, 1885 |
| 928,172 | Bernadin | June 13, 1909 |
| 1,642,824 | Paulson | Sept. 20, 1927 |
| 1,734,504 | Stone | Nov. 5, 1929 |
| 1,749,224 | Ostricker | Mar. 4, 1930 |
| 1,769,104 | Benjamin | July 1, 1930 |
| 1,942,192 | Stone | Jan. 2, 1934 |
| 2,169,772 | Schweitzer | Aug. 15, 1939 |
| 2,476,751 | McClellan | July 19, 1949 |
| 2,503,803 | Cremer et al. | Apr. 11, 1950 |
| 2,509,357 | Krause | May 30, 1950 |
| 2,641,890 | Baird | June 16, 1953 |
| 2,641,891 | Spears et al. | June 16, 1953 |
| 2,673,439 | Sawyer et al. | Mar. 30, 1954 |
| 2,673,440 | Sawyer et al. | Mar. 30, 1954 |